United States Patent [19]

Namba

[11] Patent Number: 4,989,020

[45] Date of Patent: Jan. 29, 1991

[54] PRINTING FEEDING APPARATUS FOR PRINTERS

[75] Inventor: Hideyuki Namba, Kawasaki, Japan

[73] Assignee: Fujitsu Limited, Kawasaki, Japan

[21] Appl. No.: 475,503

[22] Filed: Feb. 5, 1990

[30] Foreign Application Priority Data

Feb. 7, 1989 [JP] Japan .................................. 1-028335

[51] Int. Cl.[5] ...................... G01D 15/06; G03G 15/01

[52] U.S. Cl. ..................................... 346/157; 355/321

[58] Field of Search ......................... 346/157; 355/321

[56] References Cited

U.S. PATENT DOCUMENTS 4,466,733 8/1984 Pels ..................................... 355/321

4,916,547 4/1990 Katsumata et al. ............ 346/157 X

*Primary Examiner*—George H. Miller, Jr.

*Attorney, Agent, or Firm*—Armstrong, Nikaido, Marmelstein, Kubovcik & Murray

[57] ABSTRACT

An apparatus for feeding a printing sheet in a printer, comprising a platen for supporting and feeding a printing sheet to be printed, a plurality of printing heads used for printing, in turn, colors of yellow (Y), magenta (M), cyan (C), and black (B), and arranged along the periphery of the platen, and a motor for rotating the platen via a speed reduction gear train, so that the plurality of printing heads, in turn, print the printing sheet while the printing sheet is moved by the platen. A distance between the printing heads in the sheet feeding direction is equal to a distance for which the printing sheet is moved while as second gear engaged with a first gear directly mounted on the platen is rotated by an integral number of revolutions.

15 Claims, 5 Drawing Sheets

PRINTING FEEDING APPARATUS FOR PRINTERS

BACKGROUND OF THE INVENTION

1. Field of the Invention

This invention relates to a printer, and more particularly, to an apparatus for feeding a printing media, such as a printing sheet or paper, for printers having a plurality of printing heads arranged along the feeding direction of the printing sheet and a printing sheet driving means comprising a speed reduction gear train including reduction gears. This invention also can be applied to a drive means for driving a photosensitive drum or belt of a printer.

2. Description of the Related Art

A conventionally known printer includes a cylindrical platen for feeding a printing sheet and a plurality of printing heads arranged along the periphery of the platen for printing various colors in turn, for example, yellow (Y), magenta (M), cyan (C), and black (B), respectively, to obtain a full color image on the printing sheet. A large gear is directly mounted on the platen and driven by a step motor via a speed reduction gear train including gears.

In the conventional printer, however, the relationship between the distance from one of the printing heads to the adjacent head, and the number of revolutions of the reduction gear or gears has not been particularly considered.

These reduction gears, however, are always involved in pitch errors due to slight aberrations when these gears were made by a mechanical process. Therefore, if a speed reduction gear train including gears is employed, the pitch errors of several gears are accumulated, so that the platen is rotated with unstably with pitch errors.

For example, if four printing heads for different colors of yellow (Y), magenta (M), cyan (C), and black (B) are arranged along periphery of the platen, the pitch errors are generated in the respective printing heads as shown in FIG. 4. For example, at a printing position A, the printing of magenta (M) is incorrect in the forward direction, and on the other hand, the printing of cyan (C) is incorrect in the rearward direction. Namely, there are two kinds of pitch errors, i.e., pitch errors in the forward and rearward directions, and therefore, a maximum amount of printing aberration between two printing heads is represented as double the accumulated pitch errors.

The aberration of the printing position due to the aberration of the gear pitch generally causes an uneven darkness in the feeding direction, but a small aberration of the printing position due to pitch errors of the gears particularly causes a color aberration.

SUMMARY OF THE INVENTION

An object of the present invention is to provide an apparatus for feeding a printing sheet for printers having a plurality of printing heads arranged along the feeding direction of the printing sheet, capable of significantly reducing printing aberrations due to pitch errors of the reduction gears, between printing operations at the respective printing heads.

According to the present invention, there is provided an apparatus for feeding a printing sheet in a printer: comprising means for defining a passage for feeding a printing sheet to be printed; a plurality of printing heads arranged along said sheet feeding passage; and a drive means for moving said printing sheet along said sheet feeding passage, so that said plurality of printing heads print in turn on said printing sheet while the printing sheet is moved along said sheet feeding passage, said drive means including a reduction gear train including a large gear connected to said sheet moving means and another gear connected to a drive motor, so that said printing sheet is moved by said motor via said reduction gear train; characterized in that a distance between at least two of said printing heads in the sheet feeding direction is equal to a distance along which said printing sheet is moved during a rotation of at least one of said reduction gears, except for said large gear, by an integral number of revolutions.

According to another aspect of the present invention, there is provided an apparatus for feeding a photosensitive media in a printer: comprising means for defining a passage for feeding said photosensitive media; a plurality of toner image forming means arranged along said media passage, each of said toner image forming means including a deelectification unit for deelectrifying said photosensitive media, an electrification unit for electrifying said photosensitive media, an optical unit for forming a latent image on said photosensitive media, and a developing unit for changing said latent image to a toner image; a drive means for moving said photosensitive media along said media feeding passage, so that said plurality of toner image forming means form toner images in turn, on said photosensitive media while said photosensitive media is moved along said feeding passage; said drive means including a reduction gear train including a large gear connected to said media sheet moving means and another gear connected to a drive motor, so that said photosensitive media is moved by said motor via said reduction gear train; a transferring means for transferring said toner image from said photosensitive media to a printing sheet, and a fixing means for fixing said transferred image on the printing sheet, characterized in that a distance between at least two of said toner image forming means in the media feeding direction is equal to a distance along which said photosensitive media is moved during a rotation of at least one of said reduction gears, except for said large gear, by an integral number of revolutions.

DESCRIPTION OF THE PREFERRED EMBODIMENTS

Figure 1:
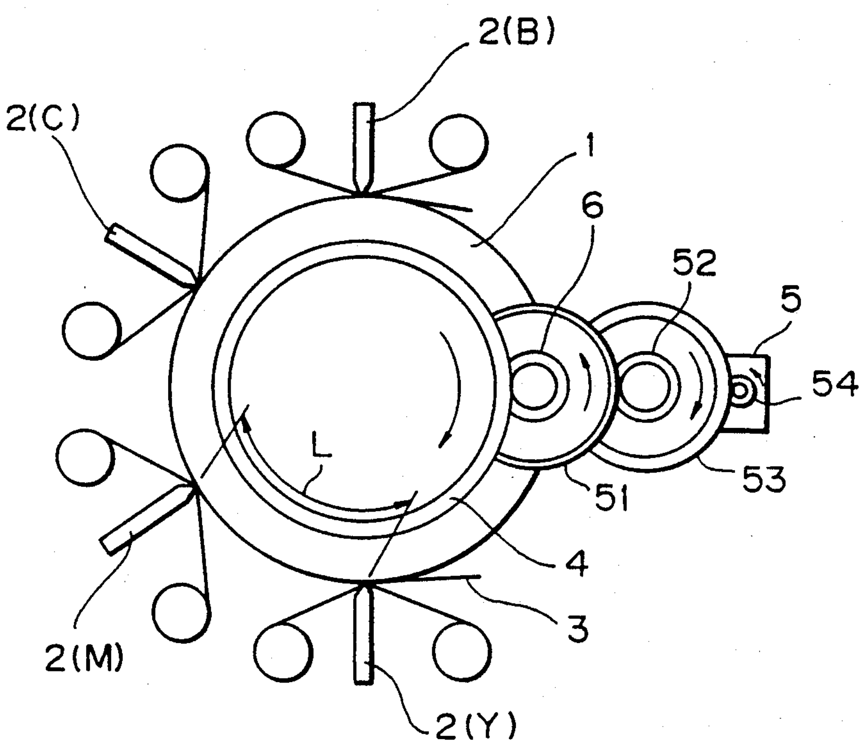
FIG. 1 is a schematic view illustrating an embodiment of a platen driving apparatus of a printer according to this invention.

Referring now to FIG. 1 , a printer comprises an apparatus for driving a platen 1, and a plurality of printing heads 2 arranged equidistantly along a circumferential direction of the platen 1, so that a printing sheet 3 is closely in contact with and fed by the platen 1 and a printing operation is performed on the printing sheet 3 by the printing heads 2. A first gear 4 is directly mounted on the platen 1 and is engaged with a second gear 6 driven by a motor 5, whereby the platen 1 is rotated, to feed the printing sheet 3, by the motor 5 via the first and second gears 4 and 6.

According to this invention, the distance between adjacent printing heads 2 along the feeding passage is equal to a distance along which the printing sheet 3 moves during one or more revolution of the second gear 6, i.e., a pitch circumferential distance of the second gear 6 or that multiplied by an integral number.

When the printing sheet 3 is moved by a distance corresponding to the distance between the adjacent printing heads 2, a predetermined printing line on the printing sheet 3 of the preceding printing head arrives at exactly the same printing line of the subsequent printing head, and further, a tooth of the second gear 6 engaging with the adjacent gear arrives at exactly the same position. Therefore, even if there is a pitch error in the second gear 6, the printing lines vary in the same manner with respect to the respective printing heads 2, so that any difference in the printing positions with respect to respective printing heads 2 is not generated due to the pitch error of the second gear 6.

Figure 3:
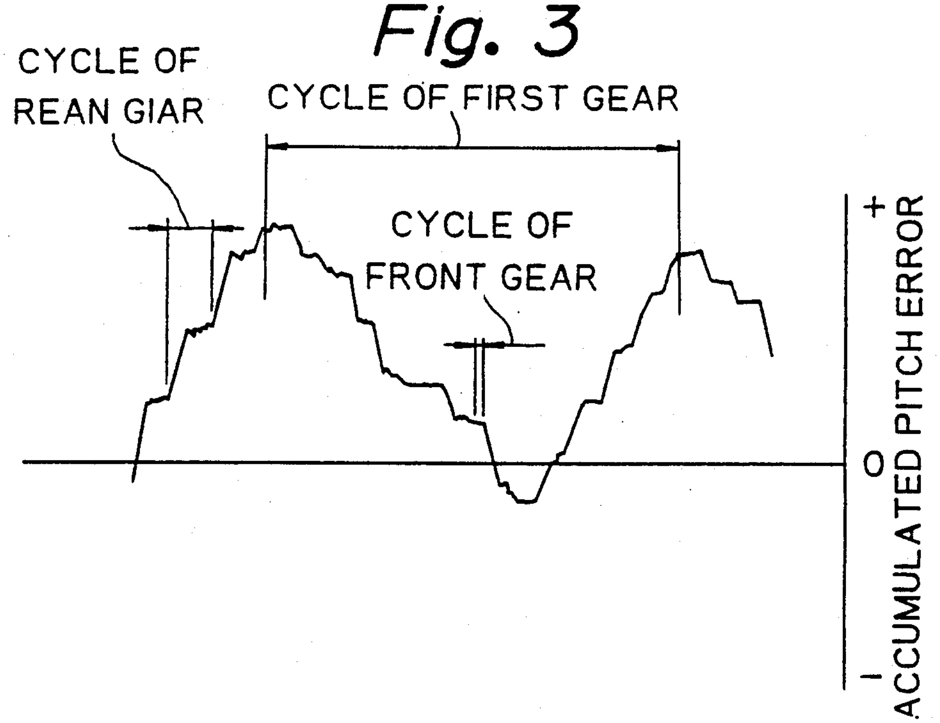
FIG. 3 shows characteristics of the reduction gears in this embodiment.

FIG. 3 shows an accumulated pitch error in a platen driving mechanism of a printer comprising two step-reduction gears arranged between the first gear 4 directly mounted on the platen 1 and the drive motor 5. As understood from the table, the revolution of the direct-mount gear (i.e., the first gear) 4 has the most influence on the accumulated pitch error, but since the first gear 4 is directly mounted on the platen 1, it is difficult to remove this pitch error. Contrary to this, the revolution of the gear mounted on or adjacent to the motor 5 has very little influence on the accumulated pitch error, and thus the pitch error due to the front gear can be ignored.

Nevertheless, the pitch error due to the engagement of the rear gear (i.e., the second gear) 6 with the direct-mounted gear (i.e., the first gear) 4 has a relatively large influence on the accumulated pitch error and, therefore, such an error cannot be neglected. In the present invention, however, the pitch error due to this second gear can be completely eliminated.

Figure 2:
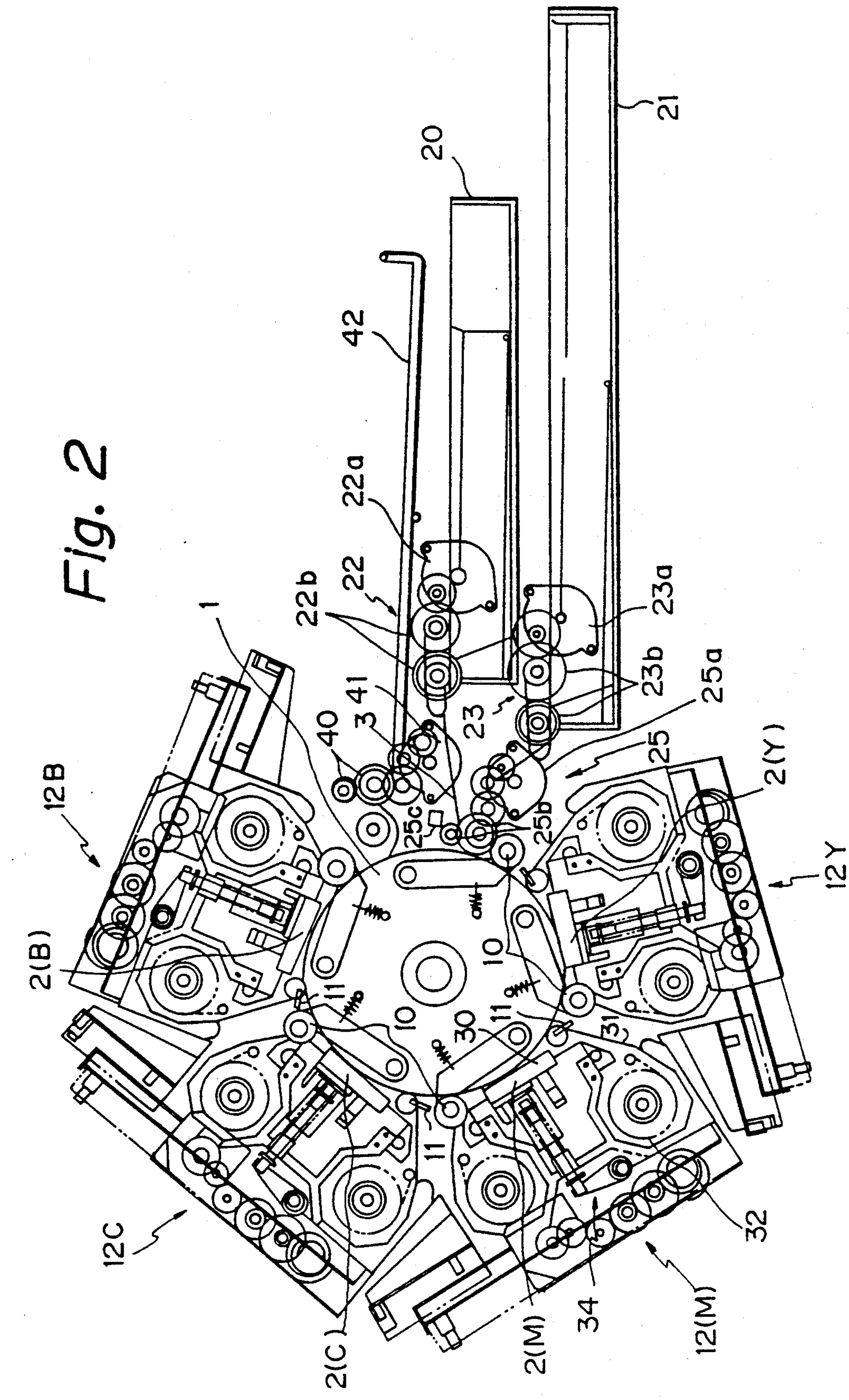
FIG. 2 is an elevational view illustrating in detail an embodiment of the platen driving apparatus of FIG. 1.

A printer illustrated in FIG. 2 comprises a platen 1 having a cylindrical circumference along which a heat-transferring printing sheet or paper 3 (hereinafter simply referred to as "printing sheet") is wound and supported to be fed. The platen 1 is rotated by the motor 5, not illustrated in FIG. 2, to feed the printing sheet 3 in the feeding direction perpendicular to the printing line by a predetermined number of steps which corresponds to a printing timing multiplied by a integral number, for example, eight times of printing.

Several pairs of pinch rollers 10 and guide rollers 11 are arranged around the cylindrical platen 1, so that the printing sheet 3 is urged to an wound along the periphery of the platen 1 to stably feed the printing sheet 3.

The means for supplying the printing sheets to the platen 1 comprises two cassette cases 20 and 21 for accommodating two kinds of printing sheets having different sizes, respectively, mechanisms 22 and 23 for picking up the printing sheets from the cassette cases 20 and 21, respectively, and gate mechanisms 25 in which the printing sheet 3 supplied from the pickup mechanism 22 or 23 is temporarily stopped and the posture thereof corrected if it is inclined with respect to the feeding direction. Namely, the gate mechanisms 25 control the start timing of feeding the printing sheets. The pickup mechanisms 22 and 23 comprise pick motors *22a* and *23a* and pick rollers *22b* and *23b*, respectively, and each of the gate mechanisms 25 comprises a gate motor *25a*, a gate roller *25b*, and a gate sensor *25c* for detecting the presence of a printing sheet 3.

The means for discharging the printing sheets 3 from the platen 1 comprises discharge rollers 40 for unloading the printing sheets 3, a discharge motor 41 for driving the discharge rollers 40, and a stacker 42 for stacking the discharged printing sheets 3. Namely, the printing sheet 3 is moved from the sheet supply means to the sheet discharge means in such a manner that it is in close contact with the outer periphery of the platen 1 within an extent of less than one revolution thereof.

Four printing units 12Y, 12M, 12C, and 12B are arranged equidistantly along a circumferential direction of the platen 1, for example, at intervals of 70°. The printing units 12Y, 12M, 12C, and 12B perform a thermal transfer printing in the colors of yellow, magenta, cyan, and black, respectively, having a density tone in accordance with input energy. Each of these four printing units 12Y, 12M, 12C, and 12B has the same construction, except that a color of thermal transfer ink ribbon 31 is different from that of the other units, and comprises a thermal printing head 2Y, 2M, 2C and 2B, a ribbon cassette 32 detachably mounted on the respective printing unit for accommodating therein the thermal transfer ink ribbon 31 of each respective color, a ribbon feeding means for winding up the ink ribbon 31 and applying a back tension thereto to ensure a stable and smooth feed of some, and a head approach/escape means 34 for moving the printing head toward or away from the platen 1.

In the drive mechanism for rotating the platen 1, a large gear (i.e., the first gear) 4 is directly and rigidly mounted on the platen 1 and rotates therewith as a single integral unit; a rear small gear (i.e, the first gear) 6 is engaged with the large, first gear 4 and rotates with a rear middle gear 51 as a integral unit; and a front small gear 52 is engaged with the rear middle gear 51 and rotates with a front middle gear 53 as a integral unit. This front middle gear 53 is engaged with an output gear 54 rigidly secured to an output shaft of the motor 5. The particulars of these gears are shown in TABLE 1.

TABLE 1

| | | number of teeth | pitch diameter | module |
|---|---|---|---|---|
| large gear | (4) | 225 | 119.72 mm | 0.5 |
| rear small gear | (6) | 45 | 23.94 mm | |
| rear middle gear | (51) | 112 | 59.6 mm | 0.5 |
| front small gear | (52) | 28 | 14.9 mm | |
| front middle gear | (53) | 176 | 56.19 mm | 0.3 |
| motor output gear | (54) | 32 | 10.82 mm | |

Accordingly, the platen 1 is driven at a reduced speed in the direction as indicated by an arrow, by the step motor 5 through a reduction gear train constructed as mentioned above, whereby the platen 1 is rotated to feed the printing sheet 3. Further, the four printing units 12Y, 12M, 12C, and 12B including printing heads 2Y, 2M, 2C, and 2B for the respective colors of yellow, magenta, cyan, and black, respectively, are arranged equidistantly by a distance L along the circumferential direction of the platen 1, and the printing sheet 3 is fed by the platen 1 while in close contact with the outer periphery thereof.

In the illustrated embodiment, the following conditions prevail:

| | |
|---|---|
| Reduction rate: | 1/110, |
| Diameter of platen 1: | 148.2 mm |
| Step motor 5: | 400 divisions |
| (1 inch./2400)/step = 0.0105833 mm/step | |

In the printer of this embodiment, a yellow color printing operation is first started at the printing head 2Y, thereafter, the platen 1 is rotated to move the printing sheet 3 by a distance L and a next magenta color printing operation is started at the printing head 2M, and then the printing operations for the colors cyan and black are started in turn at the printing heads 2C and 2B, respectively, after the same pitch movement of the printing sheet 3.

While the platen 1 is rotated to move the printing sheet 3 by the distance L, the rear small gear (i.e,. the second gear) 6 and the rear middle gear 51 rotate by exactly one revolution, the front small gear 52 and the front middle gear 53 rotate by four revolutions, and the output gear 54 of the motor 5 rotates by 20 revolutions. Namely, in this embodiment, each of the gears rotates by an exact integral number of revolutions.

Therefore, after the printing sheet 3 is moved by the distance L, the respective printing heads 2Y, 2M, 2C, and 2B start to print along the same lines, in turn, on the printing sheet 3. At this stage, all of the gears, except for the large gear (i.e., the first gear) 4, are engaged with the opposite gears by the same teeth and in the same state with respect to each other. As a result, even if the printing position has an error therein because the respective gears have respective pitch errors, such an error in the printing position with regard to the respective printing heads 2Y, 2M, 2C, and 2B has the same value in the same direction. Therefore, a relative aberration of the printing positions, i.e, aberration of colors, will not occur at the respective printing has 2Y, 2M, 2C, and 2B. Note, an aberration of the printing positions will be caused only by pitch errors of the large gear (i.e., the first gear) 4.

Table II shows the pitch errors of the respective gears and the influences thereof on the printing positions on the printing sheet 3.

Figure 4:
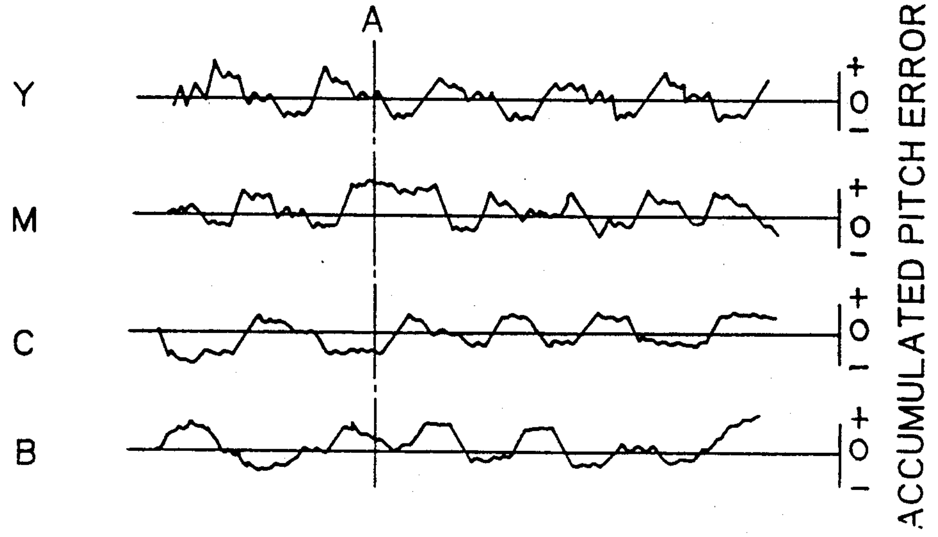
Fig. 4 PRIOR ART
FIG. 4 shows accumulated pitch errors of the printing positions in a printer known in the prior art.

In the prior art as shown in FIG. 4, the maximum printing aberration, i.e, color aberration, has twice the influence on the printing position. Therefore, in the prior art, the maximum printing aberration is 0.112 mm (56 $\mu\times 2$). In this embodiment, the printing aberration due the pitch errors of the large gear (i.e., the first gear) 4 is 0.044 mm ($22\mu\times 2$). Namely, the maximum printing aberration is reduced by 60% with respect to the prior art.

TABLE II

| | | pitch error | influence on printing position |
|---|---|---|---|
| large gear | (4) | 18μ | 22μ |
| rear small gear | (6) | 13μ | 16μ |
| rear middle gear | (51) | 16μ | 8μ |
| front small gear | (52) | 13μ | 6μ |
| front middle gear | (53) | 15μ | 2μ |
| motor output gear | (54) | 11μ | 1.5μ |
| accummulated error | | | |
| prior art: | 55μ | | |
| embodiment: | 22μ | | |

Among the several gears in the gear train, the influence on the printing aberration of the engagement of the rear gears 6 and 51 with the large gear (i.e., the first gear) 4 is the largest. Therefor, in this invention, preferably at least the small gear (the second gear) 6 engaged with the large gear (i.e., the first gear) 4 is rotated by an integral number of revolutions while the printing sheet is moved for the distance L. In Table II, assuming that only the rear gears 6 and 51, among the several gears having pitch errors, no influence on the printing aberration, the aberrations due to the rear gears 6 and 51, i.e., 16μ and 8μ can be removed, and thus the total aberration is 0.064, in which case the maximum printing aberration is reduced by 40% with respect to the prior art.

Although there are four printing heads are exemplified in the above embodiment, the number of the printing heads is not limited thereto and two or more printing heads can be arranged along the periphery of the platen. A plurality of printing heads may be used for a number of different colors or for the same color, and the distances between the adjacent printing heads need not always be the same.

Figure 5:
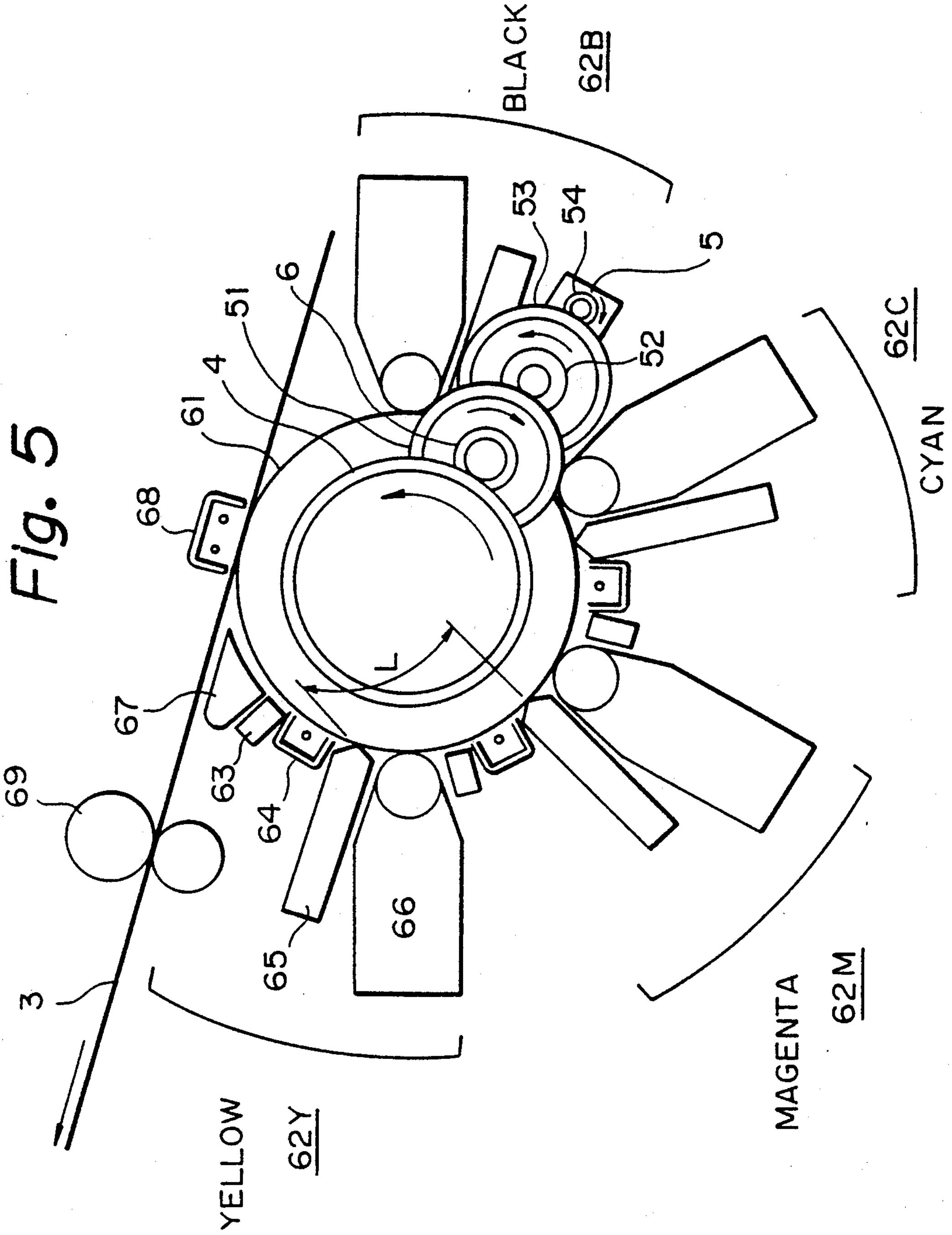
FIG. 5 is a schematic view illustrating a second embodiment of this invention, i.e., an apparatus for driving a photosensitive drum of a printer according to this invention.

FIG. 5 is a schematic view illustrating a second embodiment of this invention, i.e., an apparatus for driving a photosensitive drum of a printer according to this invention. This printer comprises an apparatus for driving an image carrying media, i.e., a photosensitive drum 61 and a plurality of toner image forming means 62Y, 62M, 62C, and 62B used for printing different colors of yellow (Y), magenta (M), cyan (C), and black (B), respectively, and arranged equidistantly along a circumferential direction of the photosensitive drum 61.

Each of the toner image forming means 62Y, 62M, 62C, and 62B comprises a deelectrification unit 63 for deelectrifying the peripheral surface of the photosensitive drum 61, an electrification unit 64 for electrifying the peripheral surface of the photosensitive drum 61, an optical unit 65 for depositing an optical beam onto the surface of the photosensitive drum 61 to form an latent image, and a developing unit for changing the latent image to a toner image.

Accordingly, while the photosensitive drum 61 is rotated, the peripheral drum surface passes through the respective toner image forming means 62Y, 62M, 62C, and 62B, whereby a mixed colored toner image is formed on the drum surface. Then the toner image on the drum surface is transferred to a printing sheet 3 by a transferring unit 68, and thereafter, the transferred image on the printing sheet 3 is fixed at a fixing unit 69.

The drive means for rotating the photosensitive drum 61 is substantially the same as that of the previous embodiment. Namely, the large gear, i.e., the first gear, 4 is directly mounted on the photosensitive drum 61, which is rotated by the motor 5 in the same manner as the first embodiment. In FIG. 5, the distance L between the adjacent toner image forming means 62Y, 62M, 62C, and 62B, i.e., between the optical units, is equal to a distance along which the peripheral surface of the photosensitive drum 61 is moved in the circumferential direction thereof during one or more revolutions of the second gear 6, i.e., a pitch circumferential distance of the second gear 6 or that multiplied by an integral number.

Figure 6:
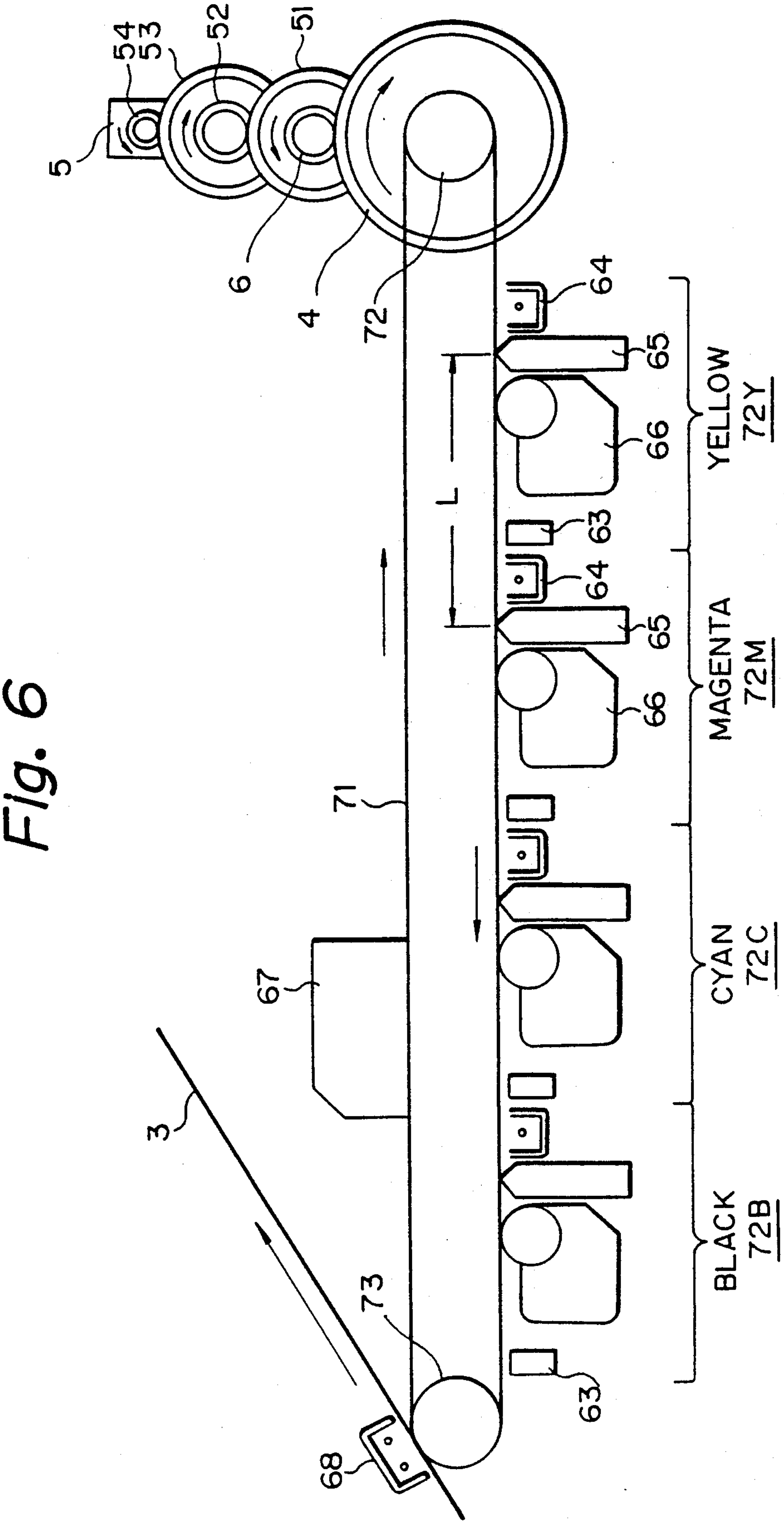
FIG. 6 is a schematic view illustrating a third embodiment of this invention, i.e., an apparatus for driving a photosensitive belt of a printer according to this invention.

FIG. 6 is a schematic view illustrating a third embodiment of this invention, i.e., an apparatus for driving an image carrying media, i.e., a photosensitive belt 71 of a printer according to this invention. This printer comprises an apparatus for driving a photosensitive belt 71 and a plurality of toner image forming means 72Y, 72M, 72C, and 72B used for printing different colors of yellow (Y), magenta (M), cyan (C), and black (B), respectively, and arranged equidistantly along a path of the photosensitive belt 71. In thee same manner as in the previous embodiment, each of the toner image forming means 72Y, 72M, 72C, and 72B comprises an electrification unit 64 for electrifying the photosensitive belt 71, an optical unit for applying a light beam onto the surface of the photosensitive belt 71 to form an latent image, a developing unit for changing the latent image to a toner image, and a deelectrification unit 63 for deelectrifying the photosensitive belt 71.

The photosensitive belt 71 is supported by the pulleys 72 and 73, and the large gear, i.e., the first gear, 4 is directly connected to the pulley 72 and driven by the motor 5 via the reduction gear train. In FIG. 6, the distance L between the adjacent toner image forming means 72Y, 72M, 72C, and 72B, i.e., between the optical units, is equal to a distance along which the photosensitive belt 71 is moved in the feed direction thereof during one or more revolutions of the second gear 6, i.e., a pitch circumferential distance of the second gear 6 or that multiplied by an integral number. Thus, in this embodiment, the same operation as in the previous embodiment can be performed.

In the embodiments shown in FIGS. 5 and 6, a dielectric drum or belt can be used as an image carrying media in place of the photosensitive drum or belt. In this case, pin electrodes are used in place of the electrification unit 64 in FIG. 5 or 6.

I claim:

1. An apparatus for feeding a printing sheet in a printer: comprising means for defining passage for feeding a printing sheet to be printed; a plurality of printing heads arranged along said sheet feeding passage; and a drive means for moving said printing sheet along said sheet feeding passage so that said plurality of printing heads print in turn, said printing sheet while the printing sheet is moved along said sheet feeding passage, said driving means including a reduction gear train including a large gear connected to said sheet moving means and another gear connected to a drive motor, whereby said printing sheet is moved by said motor via said reduction gear train;

characterized in that a distance between at least two of said printing heads in the sheet feeding direction is equal to a distance along which said printing sheet is moved during the rotation of at least one of said reduction gears, except for said large gear, by an integral number of revolutions.

2. An apparatus as set forth in claim 1, wherein said drive means for moving said printing sheet is a cylindrical platen, said plurality of printing heads are arranged along a periphery of said platen, said large gear, i.e., said first gear, is directly mounted on the platen, one of said reduction gears, i.e., said second gear, is engaged with said first gear, and said distance between said printing heads is equal to a distance along which said printing sheet is moved while said second gear is rotated by an integral number of revolutions.

3. An apparatus as set forth in claim 2, wherein said reduction gear train includes said large gear, i.e., said first gear, directly mounted on said platen, a rear small gear, i.e., said second gear, engaged with said first gear, a rear middle gear rotated integrally with said rear small gear, a front small gear engaged with said rear middle gear, and a front middle gear rotated integrally with the front small gear and engaged with an output gear mounted on an output shaft of said motor; the ratio of teeth number of said first gear and said second gear being an integral number.

4. An apparatus as set forth in claim 3, wherein the ratio of teeth number of said rear middle gear and said front small gear is also an integral number.

5. An apparatus as set forth in claim 1, wherein said plurality of printing heads are equidistantly arranged with respect to an adjacent printing head.

6. An apparatus as set forth in claim 1, wherein said plurality of printing heads are used for printing, in turn, colors of yellow (Y), magenta (M), cyan (C), and black (B).

7. An apparatus for feeding an image carrying media in a printer: comprising means for defining a passage for feeding said image carrying media; a plurality of toner image forming means arranged along said media passage, each of said toner image forming means including a deelectrification unit for deelectrifying said image carrying media, a latent image forming unit for forming a latent image on said image carrying media, and a developing unit for changing said latent image to a toner image; a drive means for moving said image carrying media along said media feed passage, so that said plurality of toner image forming means, in turn, form toner images on said image carrying media while said image carrying media is moved along said feed passage; said driving means including a reduction gear train including a large gear connected to said media sheet moving means and another gear connected to a drive motor, so that said image carrying media is moved by said motor via said reduction gear train; a transferring means for transferring said toner image from said image carrying media onto a printing sheet, and a fixing means for fixing said transferred image on the printing sheet, characterized in that a distance between at least two of said toner image forming means in the media feeding direction is equal to a distance along which said image carrying media is moved while at least one of said reduction gears, except for said large gear, is rotated by an integral number of revolutions.

8. An apparatus as set forth in claim 7, wherein said image carrying means is a photosensitive media.

9. An apparatus as set forth in claim 8, wherein said large gear, i.e., said first gear, is directly connected to said photosensitive media, one of said reduction gears, i.e., said second gear, is engaged with said first gear, and said distance between said toner image forming means is equal to a distance along which a periphery of said photosensitive drum is moved while said second gear is rotated by an integral number of revolutions.

10. An apparatus as set forth in claim 9, wherein said reduction gear train includes said large gear, i e., said first gear, directly connected to said photosensitive media, a rear small gear, i.e., said second gear, engaged with said first gear, a rear middle gear rotated integrally with said rear small gear, a front small gear engaged with said rear middle gear, and a front middle gear rotated integrally with the front small gear and engaged with an output gear mounted on an output shaft of said motor; the ratio of teeth number of said first gear and said second gear being an integral number.

11. An apparatus as set forth in claim 10, wherein the ratio of teeth number of said rear middle gear and said front small gear is also an integral number.

12. An apparatus as set forth in claim 8, wherein said photosensitive media is a photosensitive drum, and said plurality of toner image forming means are arranged along a periphery of said photosensitive drum.

13. An apparatus as set forth in claim 8, wherein said photosensitive media is a photosensitive belt, and said plurality of toner image forming means are arranged along a periphery of said belt.

14. An apparatus as set forth in claim 8, wherein said plurality of photosensitive medias are equidistantly arranged with respect to an adjacent photosensitive media.

15. An apparatus as set forth in claim 8, wherein said plurality of photosensitive medias are used for printing, in turn, colors of yellow (Y), magenta (M), cyan (C), and black (B).

* * * * *